United States Patent [19]

Yeh

[11] 4,163,367
[45] Aug. 7, 1979

[54] HYBRID FLYWHEEL/COMPRESSED-FLUID PROPULSION SYSTEM FOR NONSTATIONARY APPLICATIONS

[76] Inventor: George C. Yeh, 2 Smedley Dr., Newtown Square, Pa. 19073

[21] Appl. No.: 867,694
[22] Filed: Jan. 9, 1978
[51] Int. Cl.² .............................................. F15B 1/02
[52] U.S. Cl. ........................................ 60/414; 60/416; 60/643; 60/668; 180/165; 180/302
[58] Field of Search ................ 60/371, 407, 408, 413, 60/414, 416, 643, 659, 668, 698, 701; 180/44 F, 44 M, 65 A, 66 B; 74/572

[56] References Cited

U.S. PATENT DOCUMENTS

| | | | |
|---|---|---|---|
| 3,379,008 | 4/1968 | Manganaro | 60/408 X |
| 3,558,901 | 1/1971 | Jacobus | 60/404 X |
| 3,765,180 | 10/1973 | Brown | 60/370 |
| 4,043,126 | 8/1977 | Santos | 60/407 |

FOREIGN PATENT DOCUMENTS 2359721  6/1975  Fed. Rep. of Germany ......... 180/66 B

*Primary Examiner*—Edgar W. Geoghegan
*Attorney, Agent, or Firm*—James Albert Drobile

[57] ABSTRACT

The adaptation of a compressed-fluid (such as compressed-air) powered turbine in conjunction with the use of a flywheel as a hybrid propulsion system for nonstationary applications, such as vehicle drive, is shown and its practicality demonstrated. This propulsion system requires a nonpolluting fluid, such as air, and a source of mechanical or electrical energy to compress said fluid and energize said flywheel, both of which act as energy storage media. An expander/compressor unit, such as a turbine, is used for converting the stored energy of said compressed-fluid into shaft power by expanding said fluid, and recovering the braking energy during vehicle deceleration by compressing and storing the atmospheric air (if air is used). Said flywheel is used not only for providing peak powers necessary for vehicle acceleration but also for recovering the braking energy during vehicle deceleration and refilling said compressed-fluid in an emergency. The propulsion system can use the unlimited supply of air as the primary energy-storage medium and said flywheel as the secondary energy-storage medium. The propulsion system is not only regenerative but also quick-recharging; it, therefore, has high energy-efficiencies and broad applications.

6 Claims, 2 Drawing Figures

HYBRID FLYWHEEL/COMPRESSED-FLUID PROPULSION SYSTEM FOR NONSTATIONARY APPLICATIONS

BACKGROUND AND OBJECTS OF THE INVENTION

This invention relates to hybrid propulsion systems for nonstationary applications, such as vehicle drive, farm-machine drive, boats, etc., and more particularly to the adaptation of a hybrid flywheel/compressed-fluid propulsion system as a power drive for nonstationary applications. Compressed-fluids, such as compressed-air, have been used as an energy-storage medium for driving energy converters, such as turbines, which act as process plant drivers for many decades. Although many successful stationary applications of a compressed-air turbine can be found in various industries, very few nonstationary applications of the same have been reported in the literature. This is because the limited energy-storage capacity of a compressed-fluid that results in a restricted operating range makes its application impractical or economically infeasible.

Significant advances have been made recently in the structural materials and designs of high-pressure vessels. High-pressure compressors have also improved greatly over the years. Now, it is practical to generate and store a compressed-fluid at pressures over 30,000 pounds per square inch. Today, high-pressure vessels and compressors are lighter and more compact than they were twenty years ago due to the lighter and better structural materials and the advanced designs used. But, this will still result in a limited supply of energy of a compressed-fluid when used in nonstationary applications, such as vehicle drive. Therefore, every practical step must be taken to maximize the use of this limited energy supply if it is to be viable for nonstationary applications in this time frame.

In spite of the limited supply of energy, a compressed-fluid is an attractive energy-storage medium especially when compressed-air is used for vehicle drive since it has several advantages over other available energy-storage media. These advantages are: (1) truly nonpolluting; (2) using the unlimited supply of air; (3) having high energy efficiencies; (4) the braking energy can be recovered substantially; (5) fewer moving parts requiring little maintenance; (6) long service-life; (7) quick-recharging, etc.

While vehicle range may be improved by using lighter materials and improved designs it will still be governed by the energy stored in the compressed-fluid as well as the way the vehicle is used. The range of a vehicle driven by a compressed-fluid propulsion system will be very much dependent on many factors which fall into two major categories. The first is concerned with the compressed-fluid itself and includes such factors as the initial pressure, temperature, and volume. The second is concerned with the way in which the vehicle is operated and includes the total weight, the vehicles speed, the number of starts and stops per driving cycle, the acceleration, the wind conditions, the road-surface conditions, and the variation from a level route. In general, increased performance in these operational categories requires higher fluid-pressures and volumetric flow-rates from compressed-fluid, resulting in less total energy being available for traveling.

According to the results of studies made by this inventor, a key to improving vehicle range is to remove the requirement for peak powers from the compressed-fluid propulsion system in the operational categories described above. The results also indicated that once the vehicle has reached its maximum speed, the power requirement for maintaining its speed is approximately one fourth of the peak value. At this point in the driving cycle, if the vehicle velocity is held constant, the power requirement of the vehicle is approximately equal to the losses due to the expander, drive trains, aerodynamic drag, and the rolling resistance of the tires. My above studies have concluded that the peak power requirements during vehicle acceleration greatly reduce the available energy supply of the compressed-fluid for traveling. Therefore, it is essential to provide a system which can prevent these peak power drains in the compressed-fluid propulsion system used for vehicle drive. My studies further indicated that a second key to improving vehicle range is to recover the braking energy when the vehicle decelerates. Without the use of a recovery system, the kinetic energy generated through a propulsion system, such as a compressed-air turbine, will be dissipated partly in the frictional braking system as heat and partly in the rolling resistance and vehicle drag as it decelerates.

The main object of this invention is to provide a viable compressed-fluid propulsion system, such as compressed-air, for nonstationary applications, especially for vehicle drive by combining with a secondary power source capable of reducing peak powers drained in the compressed-fluid propulsion system during the acceleration cycle and recovering the braking energy during the deceleration cycle.

Other important objects of this invention are: (1) to provide a truly nonpolluting propulsion system for nonstationary applications, especailly vehicle drive; (2) to provide a propulsion system for nonstationary applications, especially vehicle drive, which utilizes power-storage media capable of quick-recharging; (3) to provide a propulsion system for nonstationary applications, especially vehicle drive, which contains a regenerating system for recovering the braking energy and which operates with high energy efficiencies; (4) to provide a propulsion system for nonstationary applications, especially vehicle drive, which requires little maintenance and which has a long service life, etc.

DETAILED DESCRIPTION OF THE INVENTION

The above objects of the invention are achieved by the adaptation of a suitable compressed-fluid propulsion system, preferably a compressed-air interacting with an expander/compressor unit, and a regenerative flywheel system to provide the peak powers required during vehicle acceleration and recover the braking energy during vehicle deceleration. According to the present invention, the braking energy can be recovered also by the use of said expander/compressor unit acting as a compressor to compress the atmospheric air using the shaft power transmitted from the drive trains of the vehicle, and store the compressed air generated in a tank in order to use it with the vehicle's original compressed-air supply, which can perform the work of expansion through said expander/compressor unit to produce the shaft power for transmitting to the vehicle's drive trains.

No where in the literature known to me is there a report of the use of a hybrid flywheel/compressed-fluid propulsion system for nonstationary applications, such as vehicle drive.

The results of initial studies made by this inventor indicated that approximately 75% to 90% of the braking energy can be recovered by the use of the regenerative flywheel and the regenerative compressed-air propulsion system proposed by this invention. The results also show that with three stops per mile, the range of a compressed-air powered vehicle traveling at an average speed of fifty miles per hour can be doubled for a given compressed-air supply, by the use of said regenerative systems provided by this invention, assuming that both the expander/compressor unit and the flywheel have a mechanical efficiency of 90%.

In the following, the invention will be discussed in detail by reference to the specific preferred embodiment and the typical installation of the invention shown in the accompanying drawings, FIGS. 1 and 2.

Figure 1:
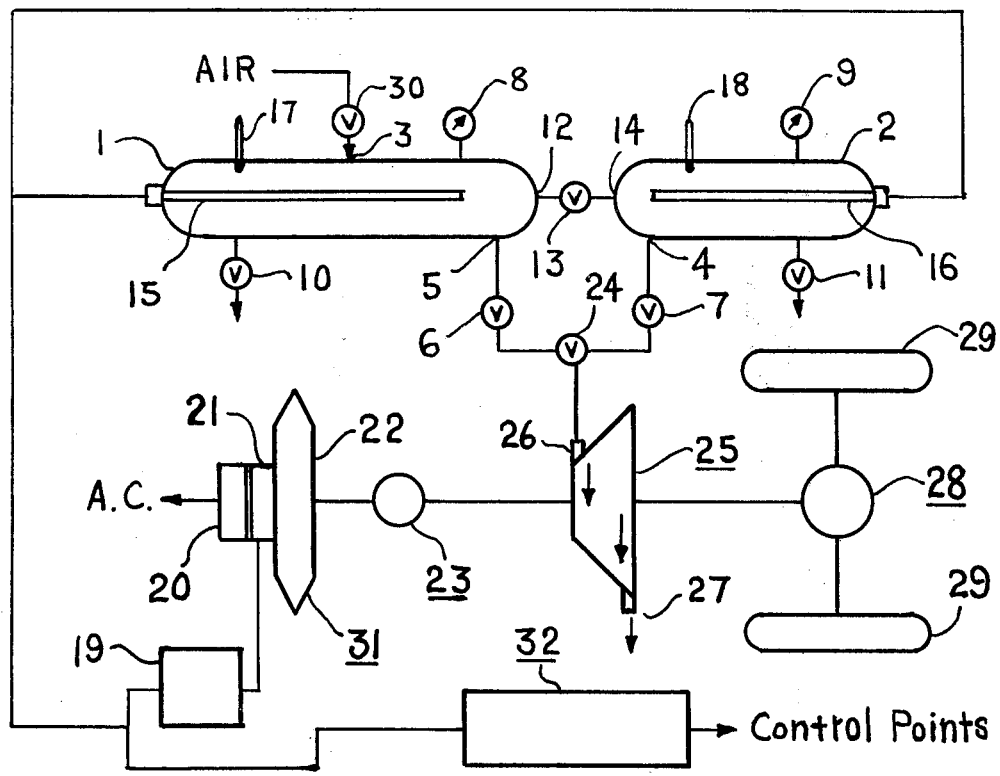

FIG. 1 is a detailed diagramatic illustration of a preferred embodiment of the hybrid flywheel/compressed-air powered vehicle drive provided by this invention. The high-pressure tank 1 has the inlet 3 and the control valve 30 to receive the initial supply of compressed-air at a maximum pressure. The maximum air pressure can be regulated by the use of the relief valve 10 and the pressure gauge 8. The air temperature inside said tank 1 can be controlled by heating the air electrically with the electrical heater 15, the thermometer 17 indicating the temperature of the air in the tank.

During vehicle acceleration, the compressed-air in said tank 1 is discharged at a desired pressure and volumetric flow-rate through the outlet 5, the control valve/pressure regulator unit 6 and the three-way valve 24, and flows into the expander/compressor unit 25 through its high-pressure air inlet 26. For vehicle acceleration, said expander/compressor unit 25 acts as an expander to convert the work of expansion performed by the compressed-air into shaft power, which is then transmitted to the drive train/differential unit 28 for driving the wheels 29. The expanded-air leaves said expander/compressor unit 25 through its low-pressure air outlet 27 into the atmosphere.

During vehicle deceleration, the vehicle kinetic energy is transmitted through said wheels 29 and said drive trains/differential unit 28, to said expander/compressor unit 25; and as a result, said expander/compressor unit 25 turns to take in the atmospheric air through its low-pressure inlet 27, which also acts as the low-pressure air outlet during vehicle acceleration as described above. The air taken in is compressed, and then leaves the high-pressure air outlet 26, which also acts as the high-pressure air inlet during vehicle acceleration as already described above. The newly generated compressured-air is led through said three-way valve 24, the control valve/pressure regulator unit 7 and the air inlet 4 into the low-pressure tank 2. Said tank 2 is used for storing the compressed-air generated by said expander/compressor unit 25 acting as a compressor during the deceleration cycle or in an emergency refilling; and therefore its air pressure is normally set below the initial air pressure of said tank 1, due to the limitation in the maximum air pressure that can be obtained by the expander/compressor unit 25 acting as a compressor. Like said tank 1, said tank 2 has a relief valve 11, a pressure gauge 9, and electrical heater 16, and a thermometer 18 for the control of the inside air pressure and temperature.

The power required for both electrical heaters 15 and 16 is supplied by the battery 19, which is constantly recharged by the alternator 21 of the flywheel/motor/alternator unit 31, comprising A.C. motor 20, alternator 21 and flywheel 22.

The flywheel/motor/alternator unit 31 has several different functions. It can be energized by the use of the A.C. motor 20 of said unit, or regenerated by the use of the shaft power transmitted from the drive train/differential unit 28 through the clutch/gear unit 23 to flywheel 22 during the vehicle deceleration cycle, in order to store the energy needed for providing the peak powers required during the vehicle acceleration cycle. It will run the alternator 21 to charge the battery 19, which is the electrical power source for all the electrical devices, instruments and controls that run on electrical power. The flywheel/motor/alternator unit 31 can be driven by the A.C. motor 20, transmitting the shaft power to the expander/compressor unit 25 acting as a compressor in order to refill one or both of the air tanks 1 and 2 through their air inlets 4 and/or 5, with the valves 6, 7, and 24 properly regulated.

The two air tanks 1 and 2 maybe provided with the openings 12 and 14, and the valve 13 to make possible the transfer of compressed-air from one tank to another when desirable.

The vehicle control system 32 contains all the electrical, mechanical, and manual controls needed to operate the vehicle; and it receives the needed electrical power supply from the battery 19. While the pressure, temperature and flow rate of the compressed-air may preferably be controlled automatically, the flywheel/motor/alternator unit 31, the clutch/gear unit 23, the expander/compressor unit 25, and the drive train/differential unit 28 may be controlled automatically or manually, depending on the specific application.

It is important to note that the braking energy recovery systems provided by this invention will not only regenerate and store the power supply but also reduce or eliminate the need of a friction-braking system, which is normally used in conjunction with the conventional vehicle drive.

Figure 2:
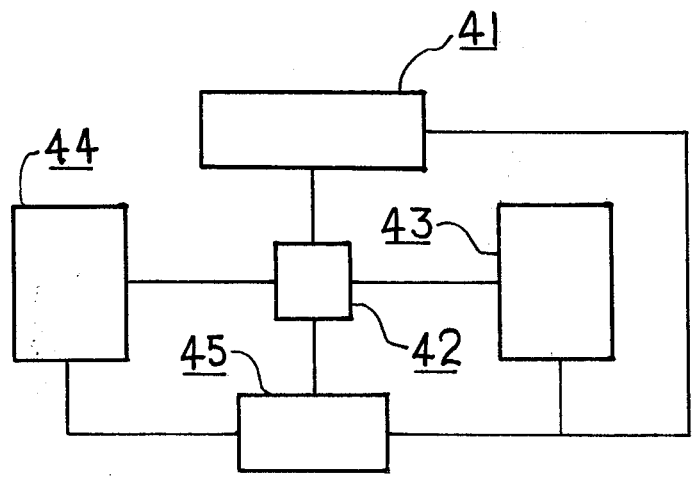

FIG. 2 illustrates in block diagram form, a typical installation of the hybrid flywheel/compressed-fluid propulsion system for nonstationary applications including vehicle drive, according to this invention. The installation consists of five component systems, each of which has functions of a specifc category. The compressed-fluid tank system 41 has high-pressure tanks and all the subsystems needed to regulate the pressure, temperature, and flow-rate of said compressed-fluid into and out of the expander/compresssor system 42. The expander/compressor to be used may be of the axial-flow type, the radial-flow type, the centrifugal type, or the reciprocating type. It may have a single stage or multiple stages having more than one inlet and outlet. If desirable, it may include a separate compressor unit for compressing the atmospheric air for recovering the braking energy or emergency refilling of said tanks. Said system 42 is provided with all the necessary means for controlling the flow and pressure of the fluid being expanded or compressed. It has a mechanical linkage with the drive train/differential system 43 for transmitting the shaft-power through said system 43 to the object to be driven, such as drive trains in case of a vehicle. The flywheel/motor/alternator system 44 normally includes a clutch and gears for transmitting the shaft-power between said systems 44 and said expander/compressor system 42 or said drive train/differential system 43, at a desired speed ratio. System 44 normally includes an A.C. motor for driving the flywheel in an emergency refilling of the compressed-fluid tanks. It also contains an alternator to generate the electrical power required for operating all the electrical devices, instruments and controls used in the specific nonstationary application. The mechanical linkage between the flywheel/motor-/alternator system 44 and the drive train/differential system 43 can be made or disconnected through the use of said clutch included in the system 44. In this way, the flywheel can perform anyone of its several functions, as already described above in reference to FIG. 1. The control system 45 contains all the necessary automatic and manual controls that are needed for the specific nonstationary application. The types of devices, instruments, controls, and other subsystem components which will perform the purported functions of systems 41, 42, 43, 44, and 45 are well known in the art and may easily be provided.

Since the use of a flywheel as a means for energy storage and shaft drive is not as common as that of a compressed-air turbine, which has been in use by various industries as long as air compressors have been known, it should be instructive to briefly discuss various important aspects of the design and operation of flywheels applicable to this invention.

While the energy stored in a flywheel is proportional to the square of the rotational speed, the theoretical maximum specific energy $(E/W)max$ of a flywheel is determined by the strength/density ratio of the material from which it is made. The following relationship may be used for the weight specific energy:

$$(E/W)_{max}(\text{kw-hr/lb}) = 0.0314 \, Kw\Sigma(\text{kpsi})/\delta(\text{lb/in}^3)$$

where $\Sigma$ and $\delta$ are the stress-level and density of the structural material respectively, and the numerical factor derives from the choice of units used. Kw is a constant which indicates the efficiency with which the particular design utilizes the material's strength, and is a maximum if the stress is distributed uniformly throughout. Therefore, in an optimum design for isotropic material, both radial and tangential stresses would be equal and uniform, and Kw approaches a valve of 1. In a realistic design, the energy per unit weight must be sacrificed somewhat in order to reduce the space required, and with it the weight and cost of the safety shield and gas or vacuum enclosure. The theoretical maximum specific energy of a flywheel may also be expressed as the maximum energy stored, per unit volume of the cylinder enclosing the flywheel's maximum axial height and its maximum radial dimension. The volumetric specific energy may be given by:

$$(E/V)_{max}(\text{kw-hr/ft}^3) = 0.0542 \, Kv\Sigma(\text{kpsi})$$

where the numerical factor derives from the choice of units used, and Kv is the efficiency with which the particular design fills the cylindrical volume as well as utilizing the material's strength; for a uniform-density material, it equals Kw times the fraction of cylindrical volume occupied by the flywheel.

As discussed above, the capacity of a flywheel system as an energy storage medium is dependent on the strength/density ratio and the strength of the structural material of the flywheel. The stress level that can actually be utilized in the structural material is lower than the highest values obtained in the laboratory due to structural flaws which might be present in the material used and/or flaws which have grown as a result of cyclic loading and/or high-cycle fatigue of the flywheel. Thus, the usable stress level and the resulting energy storage density will depend not only on the design and the material selected, but also on the homogeneity of the properties of the structural material used. Structural materials used in flywheels may be classified into the two categories, isotropic materials and unidirectional composite materials. The most commonly used materials are: metals, alloys, glass, graphite, plastics, fiber-reinforced composites, etc.

A complete flywheel system consists of various subsystem components other than the flywheel itself. The principle subsystem components are: the housing, bearings, seals, vacuum pump (to minimize windage losses), and containing ring (if required).

Part of the kinetic energy stored in a flywheel will in general be nonrecoverable, either due to internal losses or as a result of constraints imposed by other parts of the system. Sources of the internal losses include windage, bearings and seal friction, vacuum pump power requirement, and inefficiencies in both motor and gear systems (if used). The system constraints normally include the maximum rotational speed obtainable and the minimum rotational speed at which the required power can be delivered as a result of the limitation in the maximum permissible torque due to shear stresses in the flywheel system. The internal losses are the source of idling losses of a flywheel system. Both the idling losses and the system constraints will affect the rotational speed, which in turn determines the power levels of the flywheel system. The results of studies made by this inventor as well as other workers indicates that the power levels and service life of flywheels may far exceed those of common battery systems.

Many historical as well as modern applications of flywheels were reviewed by several workers including: R. C. Clark, Trans. SAE 72, 508, (1964); D. W. Rabenhorst, Preprints, ACS Division of Fuel Chemistry, 19 (6), 162–171 (Sept. 1974); and D. W. Rabenhorst and R. I. Taylor, Johns Hopkins Report TG 1229 (Dec. 1973). Many reports of studies made on various important aspects of flywheels can be easily found in the literature.

Thus, a hybrid flywheel/compressed-fluid powered, regenerative, quick-recharging, nonpolluting propulsion system for nonstationary applications, such as vehicle drive, which can use the unlimited supply of air as the working fluid and requires no fuels has been shown. The hybrid propulsion system has the effects and performance characteristics that are quite different from those of the conventional flywheel power system or of the conventional compressed-air power system, as may be ovbious from the above discussion. Although a preferable embodiment using air as the working fluid for application to vehicle drive has been disclosed fully, it will be obvious to those skilled in the art that various modifications and other applications may be made without departing from the spirit of the invention, as exemplified by the typical application shown in FIG. 2. Today, various improved and light materials, such as fiber-reinforced composite materials, are available for the construction of high-pressure tanks and flywheels having high-performance characterisitics. With these improved materials, high-pressure tanks and flywheels can be designed and constructed economically to withstand working stresses over several hundred thousand pounds per square inch, and flywheels can be constructed to provide service cycles as many as nearly a million cycles. High-pressure compressors can be installed easily in service stations and parking lots across the country to provide a quick-refilling of the compressed-air tanks used in vehicles driven by the invention, as often as needed. To assist the invention in long-range crusing, a small combustion-engine powered compressor may be carried or installed in the vehicle in order to refill the compressed-air tanks wherever and whenever needed. The compressed-fluid, such as compressed-air, carried in the vehicle can be partly used for generating cold and hot air streams by using a vortex-tube, for cooling or heating the interior of the vehicle for the comfort of passengers. Today, vehicles can be designed and built to utilize lighter materials, achieve lower aerodynamic drag losses by reducing frontal area and drag coefficient, reduce spinlosses by using more efficient bearings and gears, and lower rolling resistance by using radial tires. Needless to say, all of these factors have the effect of improving vehicle range for a fixed charge of compressed-air.

It should be noted that the present invention is intended for and adaptable to all nonstationary applications. It may use any nonpolluting fluid as the energy-storage medium, any type of expander or compressor for generating and regenerating shaft power, and any type of flywheel for storing and regenerating shaft power. It may also be used in conjunction with another propulsion system, if desirable. It is the combination of a compressed-fluid power system and a regenerative flywheel power system, which produces the desirable effects and characteristics that are absent from the conventional compressed-fluid power system alone or the conventional flywheel power system alone, that is the heart of the present invention.

The invention claimed is:

1. A hybrid flywheel/compressed-fluid propulsion system for a self-propelled object, said system comprising:
  (A) a rotatable drive shaft adapted to propel said object when rotated;
  (B) energy conversion means connected to said drive shaft and employing a compressible working fluid, said energy conversion means being adapted, when supplied with said working fluid in a compressed state, to expand said working fluid and produce shaft work for transmission through said drive shaft;
  (C) a primary container for storing said compressible working fluid in compressed state;
  (D) first conduit means adapted to connect said primary container and said energy conversion means, and to supply compressed working fluid to said energy conversion means;
  (E) first valve means interrrupting said first conduit means and adapted to selectively control the flow of compressed working fluid to said conversion means; and
  (F) a flywheel connected to said drive shaft through disconnecting means adapted to selectively connect said disconnect, independent of said conversion means, said flywheel from said drive shaft.

2. Propulsion system according to claim 1 and additionally comprising separate drive means adapted to selectively and independently drive said flywheel.

3. Propulsion system according to claim 1 additionally comprising a generator connected to said flywheel and adapted to generate electrical power when rotated, and a rechargeable battery for storing the electrical energy so generated.

4. Propulsion system according to claim 1 wherein said energy conversion means also is adapted, when driven by said drive shaft and supplied with said working fluid in noncompressed state, to compress said working fluid through conversion of shaft work transmitted by said drive shaft into work of compression.

5. Propulsion system according to claim 4 and additionally comprising:
  (A) a secondary container for storing said working fluid in compressed state;
  (B) second conduit means adapted to connect said secondary container and said energy conversion means, and to transmit compressed working fluid between said energy conversion means and said secondary container;
  (C) second valve means interrupting said second conduit means and adapted to selectively control the flow of compressed working fluid therethrough; and
  (D) third valve means adapted to selectively connect said first conduit means and said second conduit means to said conversion means.

6. Propulsion system according to claim 1 or 5 and additionally comprising means for heating and controlling the temperature of said working fluid inside of said container.

* * * * *

UNITED STATES PATENT OFFICE
CERTIFICATE OF CORRECTION

PATENT NO. : 4,163,367
DATED : August 7, 1979
INVENTOR(S) : George C. Yeh

It is certified that error appears in the above-identified patent and that said Letters Patent are hereby corrected as shown below:

Column 8, Line 13, the word "said" (first occurrence) should read -- and -- .

Signed and Sealed this

Thirteenth Day of November 1979

[SEAL]

Attest:

RUTH C. MASON
Attesting Officer

LUTRELLE F. PARKER
Acting Commissioner of Patents and Trademarks